US006637301B2

(12) United States Patent
Yoshimura

(10) Patent No.: US 6,637,301 B2
(45) Date of Patent: Oct. 28, 2003

(54) PRODUCTION METHOD OF THIN PLATE AND THIN PLATE SUPPORT FOR CHUCKING EMPLOYED IN THE METHOD

(76) Inventor: Ichiro Yoshimura, 43-6, Shimizu-cho, Itabashi-ku, Tokyo (JP)

(*) Notice: Subject to any disclaimer, the term of this patent is extended or adjusted under 35 U.S.C. 154(b) by 114 days.

(21) Appl. No.: 09/737,460

(22) Filed: Dec. 18, 2000

(65) Prior Publication Data

US 2002/0025447 A1 Feb. 28, 2002

(30) Foreign Application Priority Data

Aug. 30, 2000 (JP) ....................................... 2000-261279

(51) Int. Cl.[7] ............................. B23B 3/00; G04D 3/00
(52) U.S. Cl. ....................................... 82/1.11; 29/896.3
(58) Field of Search ............................... 82/1.11; 83/40, 83/55, 667, 682, 695, 875, 879; 269/47; 451/390, 397, 398, 402; 29/896.3, 896.31, 896.32, 896.33, 896.34; 368/232

(56) References Cited

U.S. PATENT DOCUMENTS

| | | | | | |
|---|---|---|---|---|---|
| 3,579,914 | A | * | 5/1971 | Price | 451/239 |
| 3,962,833 | A | * | 6/1976 | Johnson | 428/40.6 |
| 4,993,895 | A | * | 2/1991 | Nordstrom | 408/103 |
| 5,711,835 | A | * | 1/1998 | Dona et al. | 156/153 |
| 5,839,334 | A | * | 11/1998 | Yoshimura | 82/1.11 |
| 6,186,711 | B1 | * | 2/2001 | Mueller | 409/132 |
| 6,422,922 | B1 | * | 7/2002 | Okamura et al. | 451/287 |
| 2002/0025447 | A1 | * | 2/2002 | Yoshimura | 428/600 |

FOREIGN PATENT DOCUMENTS

| | | | |
|---|---|---|---|
| JP | 3052133 | 4/2000 | B44C/1/14 |

OTHER PUBLICATIONS

Patent Abstract of Japan 11–070793 Mar. 16, 1999.

* cited by examiner

*Primary Examiner*—A. L. Wellington
*Assistant Examiner*—Brian Walsh
(74) *Attorney, Agent, or Firm*—Sughrue Mion, PLLC

(57) ABSTRACT

A production method of a thin plate includes preparing a thin plate support with a receptacle cavity having a bottom surface formed with a complementary three-dimensional pattern with a three-dimensional pattern of one side surface of a machining object, setting the machining object within the receptacle cavity with mating the complementary three-dimensional pattern with the three-dimensional pattern on the one surface of the machining object, chucking the thin plate support carrying the machining object set in the receptacle cavity on a machine tool, driving the thin plate support together with the machining object to rotate, and machining the machining object as being driven to rotate on the machine tool from the other side of the machining object by means of a cutting tool.

8 Claims, 15 Drawing Sheets

PRODUCTION METHOD OF THIN PLATE AND THIN PLATE SUPPORT FOR CHUCKING EMPLOYED IN THE METHOD

BACKGROUND OF THE INVENTION

1. Field of the Invention

The present invention relates to a production method of a thin plate produced by cutting a foreign coin, an imitation of the foreign coin or the like as processing object, for use as an hour plate (a dial) of watch or the like, and a thin plate support for chucking to be employed in the method.

2. Description of the Related Art

Commonly owned Japanese Patent No. 3052133 discloses a production method of a thin plate to be used by attaching on outer peripheral surface of a cigarette lighter and various articles.

As shown in FIGS. 13 and 14, in the production method, a thin plate portion 1 in gear shape, for example and a chucking annular portion 2 surrounding the thin plate portion 1 and four connecting pieces 3 connecting between the thin plate portion 1 and the chucking annular portion 2 are initially formed on one side surface 5*a* of a base material portion 5 as an integral primary processed article a. The primary processed article a is set in a lathe turning machine provided with a receptacle cavity 6*a* with chucking by a chuck 6 for rotation. While the primary processed article a is driven to rotate by the lathe turning machine, the base material portion 5 is cut ands removed from the other side surface 5*b* to one side surface 5*a* by a cutting tool 7 to form a secondary processed article. Thereafter, the thin plate portion 1 is cut off from all of the connecting piece portions 1.

The applicant has attempted to produce an hour plate for the watch of so-called skeleton type using a coin as an application of the foregoing production method. For this purpose, as shown in FIG. 15, cutting is performed along a contour of three dimensional patterns 9, 10, 11*a* and 11*b* appearing on one side surface of a foreign coin 8 to form window openings 12*a,* 12*b,* 12*c,* 12*d* and 12*e* for viewing at least a part of a movement (not shown) between an external peripheral frame and the three dimensional pattern portions 9, 10, 11*a* and 11*b*. Also, machining process is effected for the other side surface for obtaining the thin plate in a thickness about 0.4 mm.

However, if attempt is made to form the hour plate of the watch by the production method the thin plate, it becomes necessary to directly chuck the outer peripheral portion of the foreign coin by a chuck 6 since the foreign coin 8 does not have a portion corresponding to the chucking annular portion 2 of the primary processed article a as shown in FIGS. 13 and 14.

Therefore, a binding force of the chuck 6 in inherently exerted the foreign coin directly to possibly cause deformation, such as bowing or the like associating with reduction of the late thickness according to progress of machining.

Particularly, upon machining or cutting the coin of noble metal, such as gold coin, sliver coin, or the like having relatively low hardness, in addition to bowing deformation, kink may be caused at the peripheral edge portion of the window opening to make machining difficult.

Furthermore, since the receptacle cavity 6*a* for receiving the coin is formed in the chuck, a lots of chucks corresponding to kinds of the coins has to be prepared. In addition, exchanging of the chucks per se is troublesome work.

SUMMARY OF THE INVENTION

The present invention has been worked out for solving the shortcoming in the prior art. Therefore, it is an object of the present invention to provide a production method of a thin plate and a thin plate support for chucking to be employed in the method, which can avoid occurrence of deformation, such as bowing, kink and so forth in a processing object, such as coin irrespective of hardness of the material and can form window openings around three-dimensional pattern to be maintained.

According to one aspect of the present invention, a production method of a thin plate comprises the steps of:

- preparing thin plate support with a receptacle cavity having a bottom surface formed with a complementary three-dimensional pattern with a three-dimensional pattern on one side surface of a machining object;
- setting the machining object within the receptacle cavity with mating the complementary three-dimensional pattern with the three-dimensional pattern on the one surface of the machining object;
- chucking the thin plate support carrying the machining object set in the receptacle cavity on a machine tool;
- driving the thin plate support together with the machining object to rotate; and
- machining the machining object as being driven to rotate on the machine tool from the other side of the machining object by means of a cutting tool.

In the present invention set forth above, the machining object may be machined until the three-dimensional pattern being left and window openings being formed around the three-dimensional pattern. Thus, machining of the machining object and formation of the window openings are formed simultaneously.

On the other hand, the machining object is formed with a window opening defining grooves extending along the contour of the window openings, and the machining is performed by the cutting tool until the window opening defining grooves appear. Thus, formation of the window openings can be facilitated even when a height difference between the portions where the window openings are to be formed and the three-dimensional pattern portion.

On the other hand, the machining process is terminated before window openings are formed and the machining object is released from the thin plate support, and subsequently subject to cutting process for forming the thin plate maintaining the three-dimensional pattern and defining the window openings. By this process, even for the machining object having low hardness, such as gold coin, silver coin or the like, the window openings can be formed neatly.

The production method further comprise positioning means consisted of a pair of members, for mating and engaging a three-dimensional pattern portion of the machining object and the thin plate support for chucking, one of the members of the positioning means being provided on the machining object and the other of the members being provided in a receptacle cavity, the machining object being received with in the receptacle cavity with positioning by the positioning means for making the pair of members. Thus, positioning between the thin plate and the thin plate support for chucking can be done easily and in short period.

The machining object may be bonded and fixed within the receptacle cavity of the thin plate support for chucking by an adhesive for performing machining of the machining object. Thus, thin plate having thinner thickness than that formed conventionally can be formed without causing deformation, such as bowing.

The thin plate support bonded a thin plate or the machining object on machining within the receptacle cavity, may be dipped in a releasing agent for releasing the thin plate or the machining object on machining object from the receptacle cavity. By this, the thin plate or the machining object on machining can be released from the thin plate support without application of external force. Therefore, thin plate can be released without causing deformation.

According to another aspect of the present invention, a thin plate support for chucking provided with a receptacle cavity having a bottom surface formed with a mating portion mating with one side of a machining object.

In the preferred construction, the mating portion may be formed with a three-dimensional pattern complementary with a three-dimensional pattern of the machining object, the mating portion also has a ridge matching with a contour of a window opening to be formed and with a predetermined height. This facilitates formation of the window openings in the machining object.

A receptacle cavity and the machining object may be bonded by an adhesive while machined and the thin plate support is released the matching object by releasing agent penetrating therebetween. By this, the thin plate or the machining object on machining can be released from the thin plate support without application of external force. Therefore, thin plate can be released without causing deformation.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1:
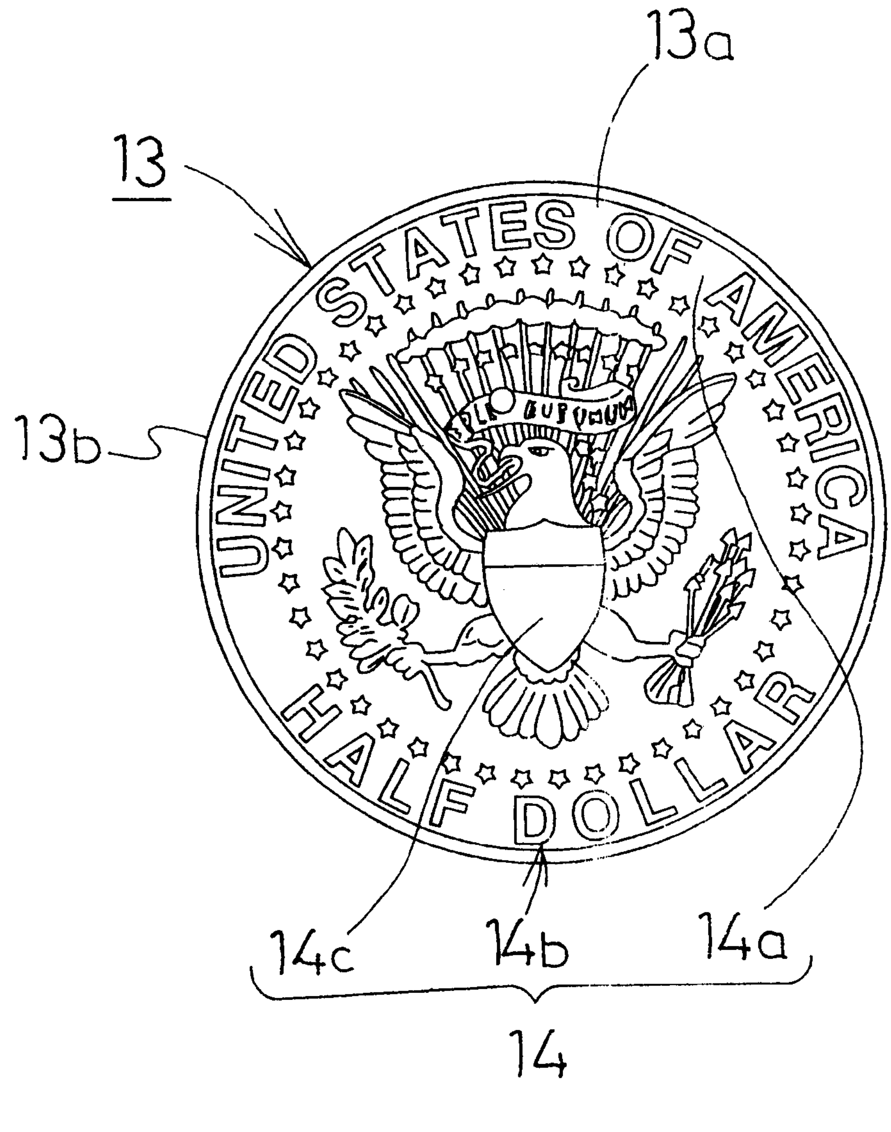
FIG. 1 is one side elevation of a foreign coin as a processing object.

In FIG. 1, the reference numeral 13 denotes a foreign coin as a processing object having relatively high hardness which is formed of copper, nickel, stainless steel or the like. The coin 13 has a disc shaped main plate 13*a* of approximately 30 mm in diameter and approximately 2 mm in thickness. Three-dimensional patterns which will be discussed later, are formed on both side surfaces in slightly projecting manner. It should be noted that, in the drawing, actual foreign coin 13 is illustrated in enlarged size.

In the shown example, the coin contains on one side surface of the disc shaped main plate 13*a,* three-dimensional pattern portion 14 which is consisted of a character string portion 14*a* containing characters "UNITED STATES OF AMERICA" and extending circumferentially at inside of an external peripheral edge 13*b,* a character string portion 14*b* containing characters "HALF DOLLAR" and extending circumferentially inside of the external peripheral edge, and a central portion 14*c* containing designed American eagle.

Figure 2:
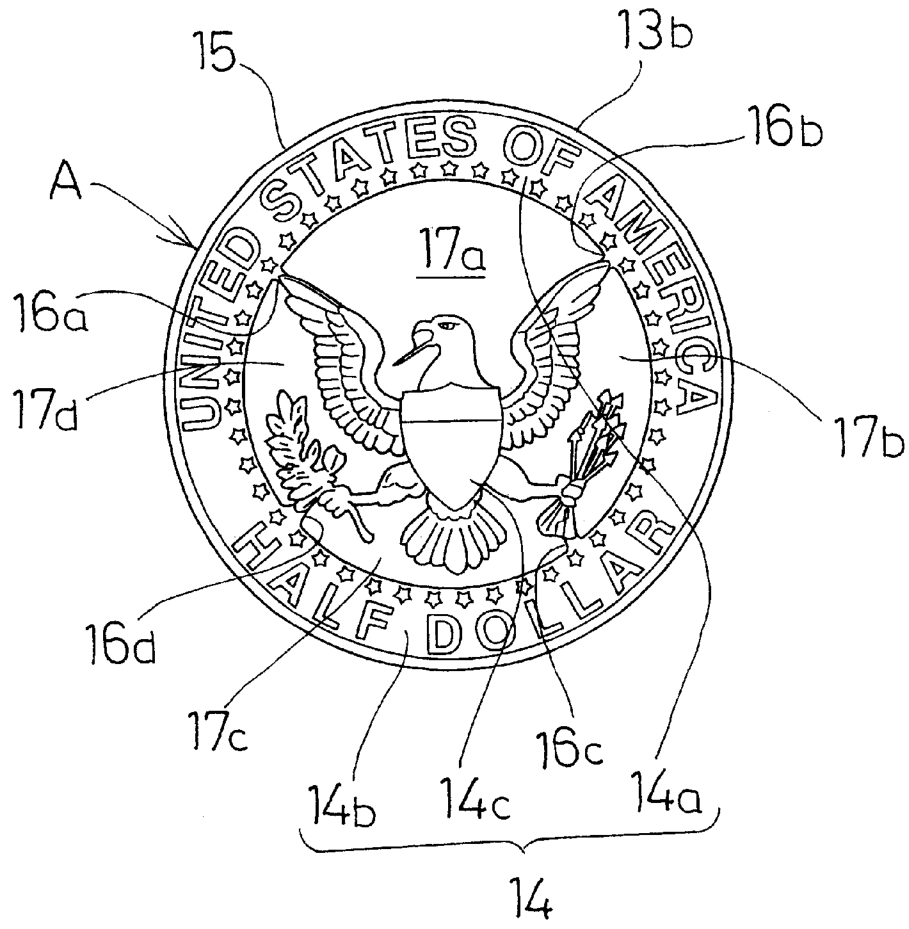
FIG. 2 is one side elevation of a thin plate produced by the preferred embodiment of a production method according to the present invention.

In FIG. 2, the reference sign A denotes a thin plate formed from the foreign coin by the production method according to the present invention. The thin plate A is consisted of an annular portion 15 having a given width selected for containing the character string 14*a* "UNITED STATES OF AMERICA" and the character string 14*b* "HALF DOLLAR" and extending along the external peripheral edge 13*b,* and a central portion 14*c* containing the designed American eagle. The annular portion 15 and the central portion 14*c* are connected by connecting pieces 16*a,* 16*b,* 16*c* and 16*d* in integral manner. By the annular portion 15, the central portion 14*c* and the connecting pieces 16*a,* 16*b,* 16*c* and 16*d,* window openings 17*a,* 17*b,* 17*c* and 17*d* having peripheral matching with the contours of respective of the annular portion 15, the central portion 14*c* and the connecting pieces 16*a,* 16*b,* 16*c* and 16*d,* are defined.

Figure 3:
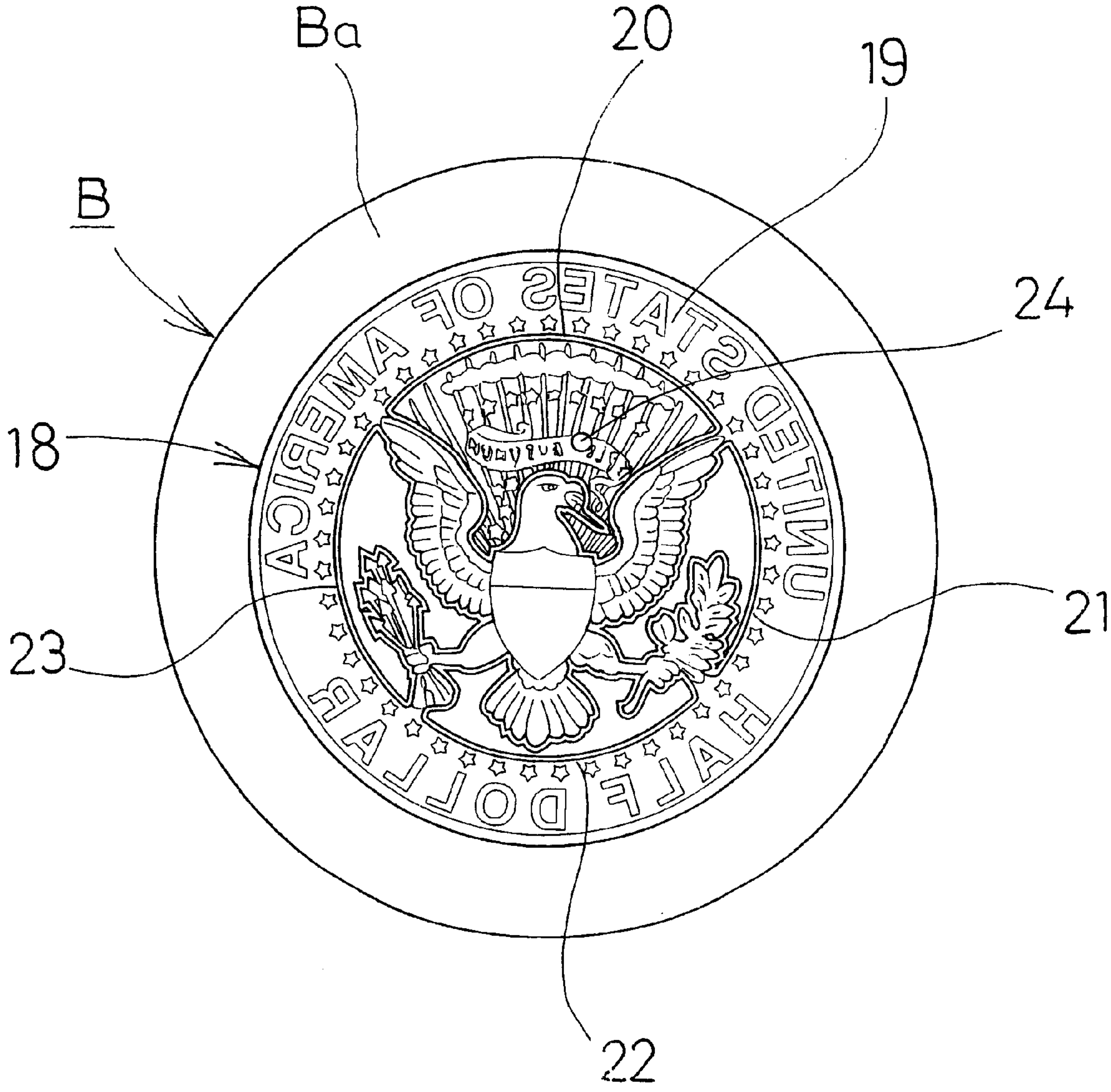
FIG. 3 is one side elevation of the first embodiment of a thin plate support for chucking according to the present invention.
Figure 4:
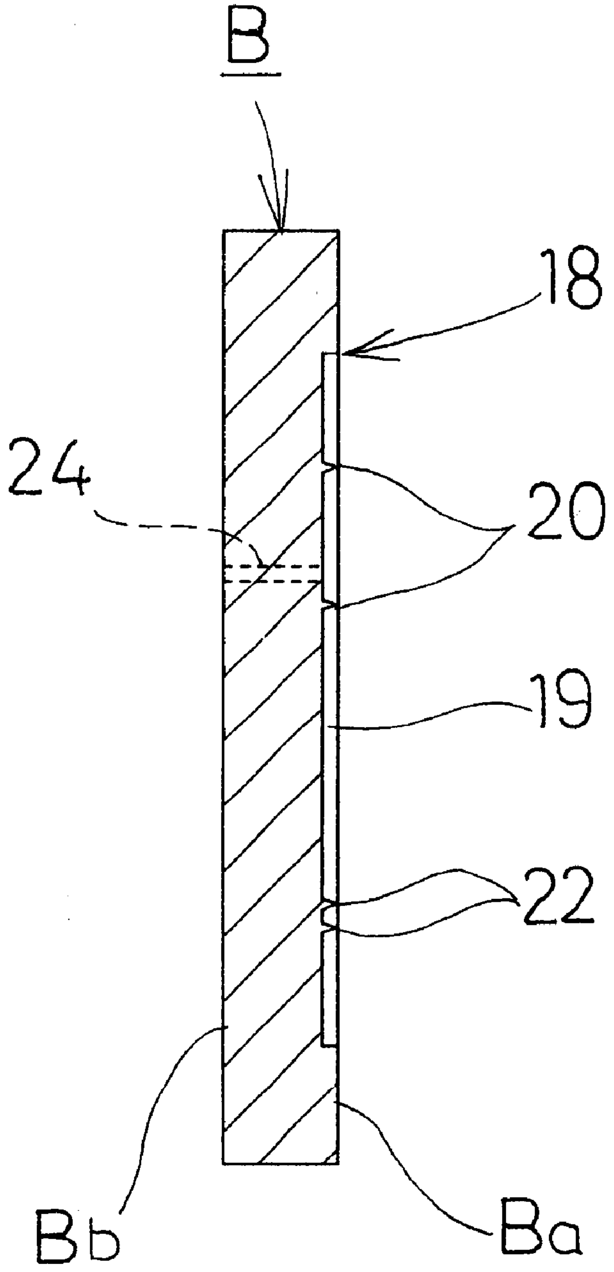
FIG. 4 is a section of the first embodiment of the thin plate support for chucking according to the present invention.

In FIG. 3, the reference sign denotes the first embodiment of a thin plate support for chucking according to the present invention, which is used upon formation of the thin plate A by machining the foreign coin 13. As shown in FIGS. 3 and 4, the thin plate support B is formed in to disc shape with a coaxially formed with a receptacle cavity 18 on one side surface Ba for receiving the foreign coin 13 therein.

The receptacle cavity 18 is formed to be shallow than thickness of the disc shaped main plate 13*a* of the foreign coin. In the shown embodiment, the receptacle cavity 18 is formed to have a depth of about 0.4 mm, for example. An engaging portion 19 is formed o bottom surface of the receptacle cavity 18 by way of electrical discharge machining or the like.

The engaging portion 19 has a three-dimensionally patterned surface in a shape complementary with the three-dimensional pattern formed on the side surface of the coin to be processed. Also, ridges 20 to 23 extend at positions corresponding to respective contours of the annular portion 15, the central portion 14*c* and the connecting pieces 16*a,* 16*b,* 16*c* and 16*d.* The ridges 20 to 23 are provided respectively predetermined heights.

The reference numeral 24 denotes a positioning hole for positioning the foreign coin 13 as being received in the receptacle cavity 18. The positioning hole 24 is formed at a position corresponding to the window opening to be formed in the thin plate, and thus surrounded by the ridge 20.

The first embodiment of the production method of the thin plate according the present invention, using the first embodiment of the thin plate support B for chucking as set forth above.

Figure 5:
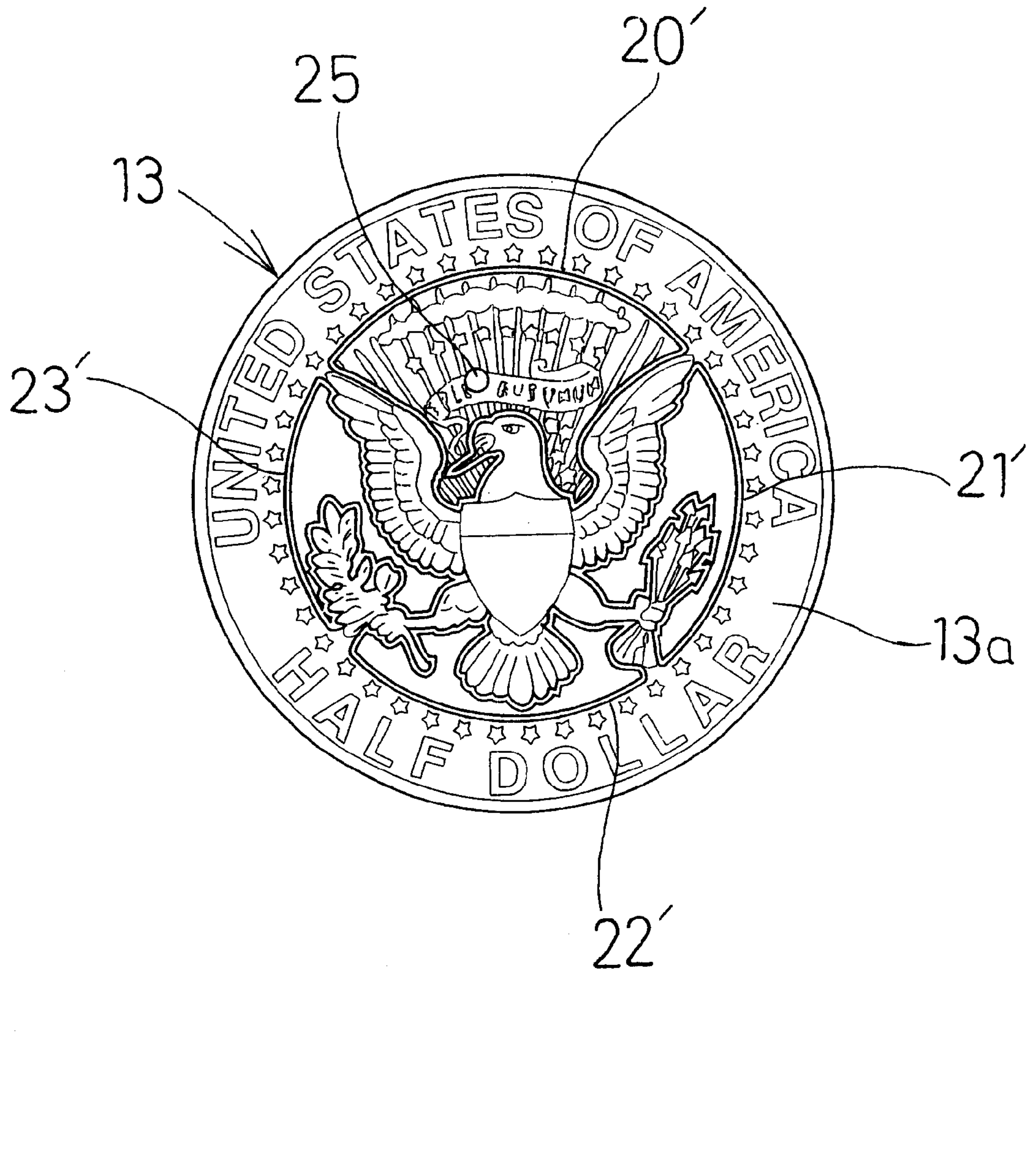
FIG. 5 is one side elevation showing a condition where a positioning hole is formed in the processing object together with a window defining groove.

As shown in FIG. 5, at the position of the disc shaped main plate 13*a* of the foreign coin corresponding to the positioning hole 24 of the thin plate support B, a positioning pin 25 is projected. Also, window opening defining grooves 20' to 23' matching with the contour of the window openings 17*a,* 17*b,* 17*c* and 17*d* are formed on the foreign coin 13 by an emboss press or other methods.

Figure 6:
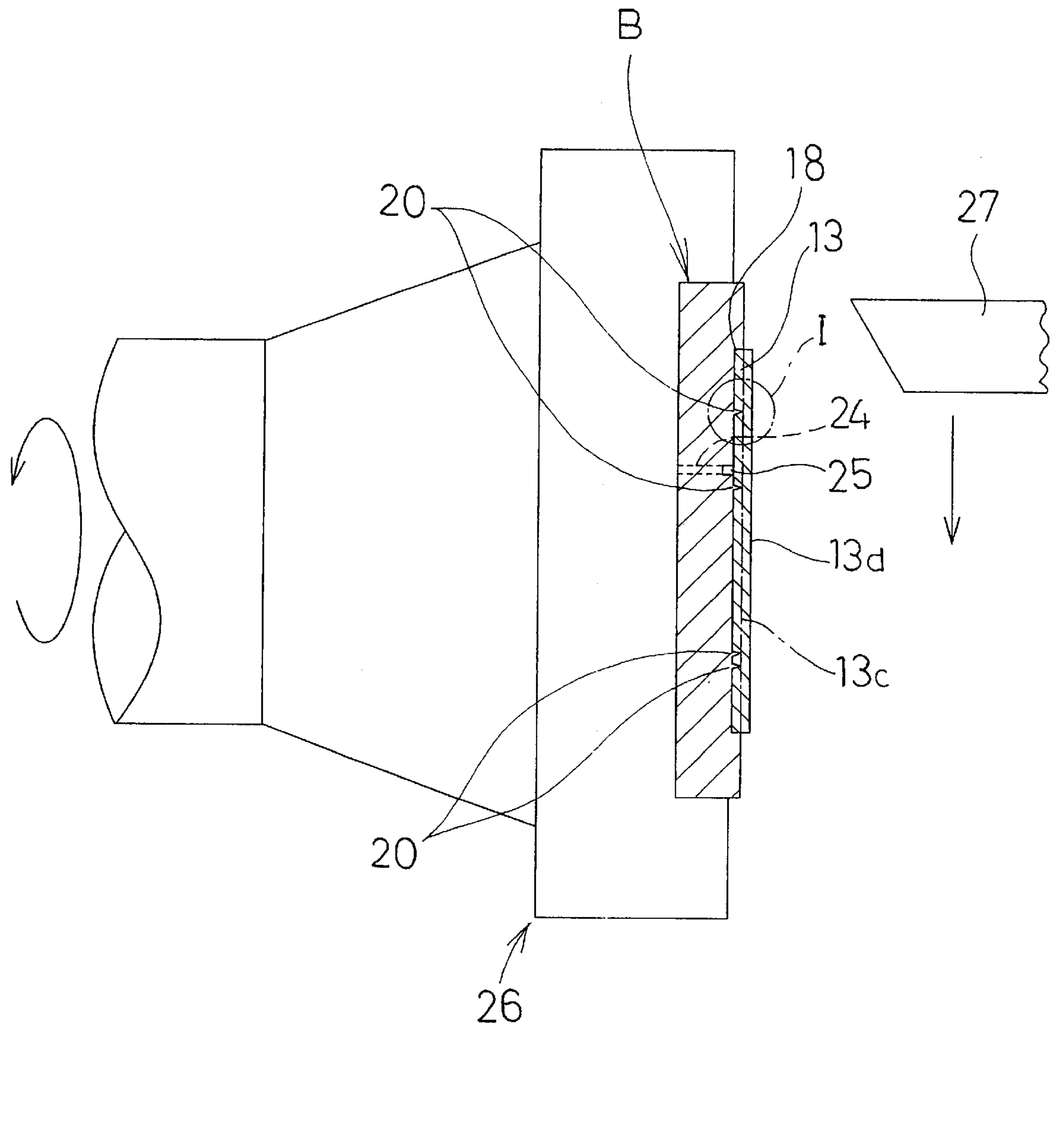
FIG. 6 is a side elevation of the first embodiment of the thin plate support for chucking according to the present invention receiving the processing object with a receptacle groove, as chucked in a machine tool, showing a condition before machining the processing object.
Figure 7:
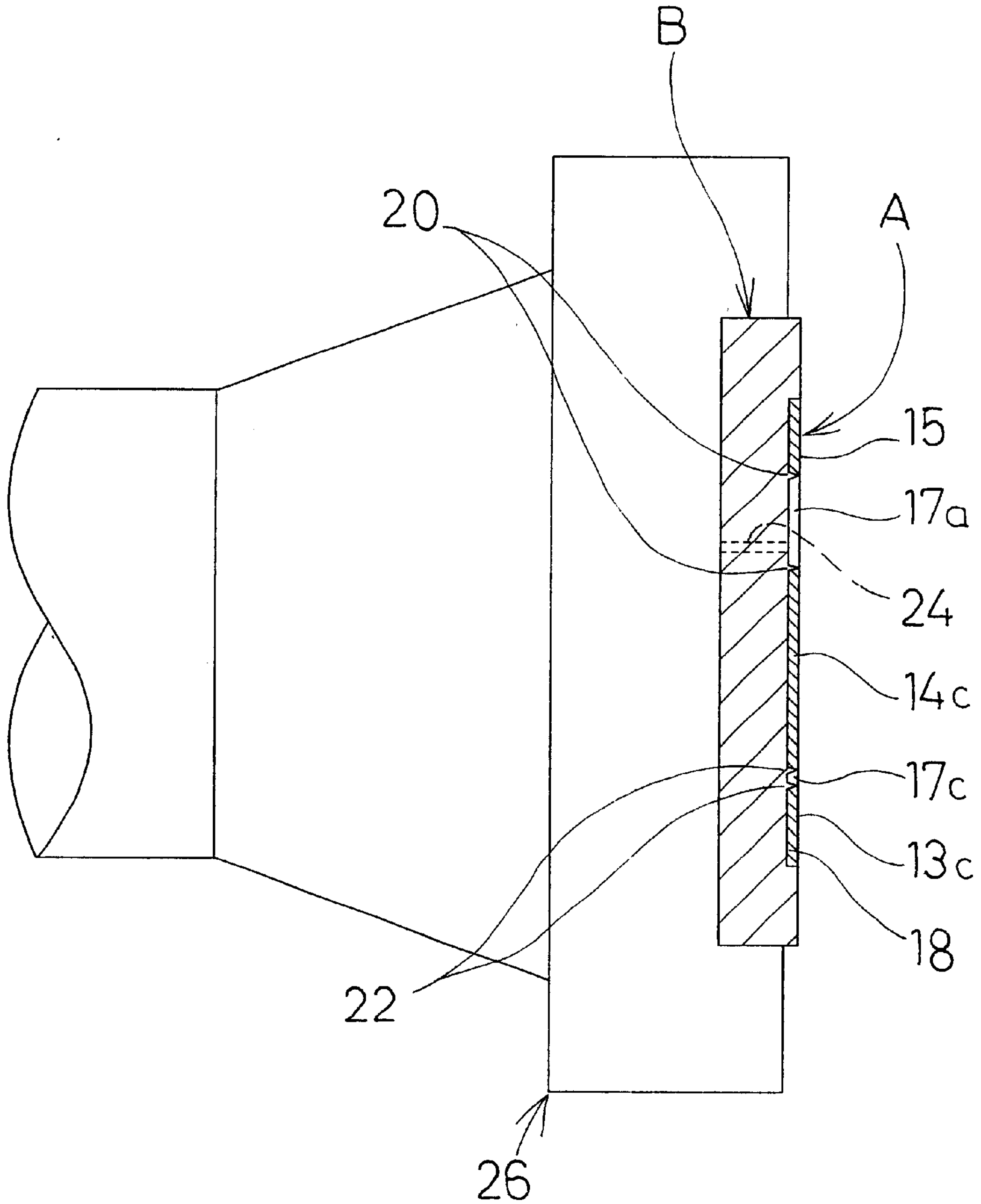
FIG. 7 is a side elevation similar to FIG. 6 but showing a condition after machining of the processing object.
Figure 8:
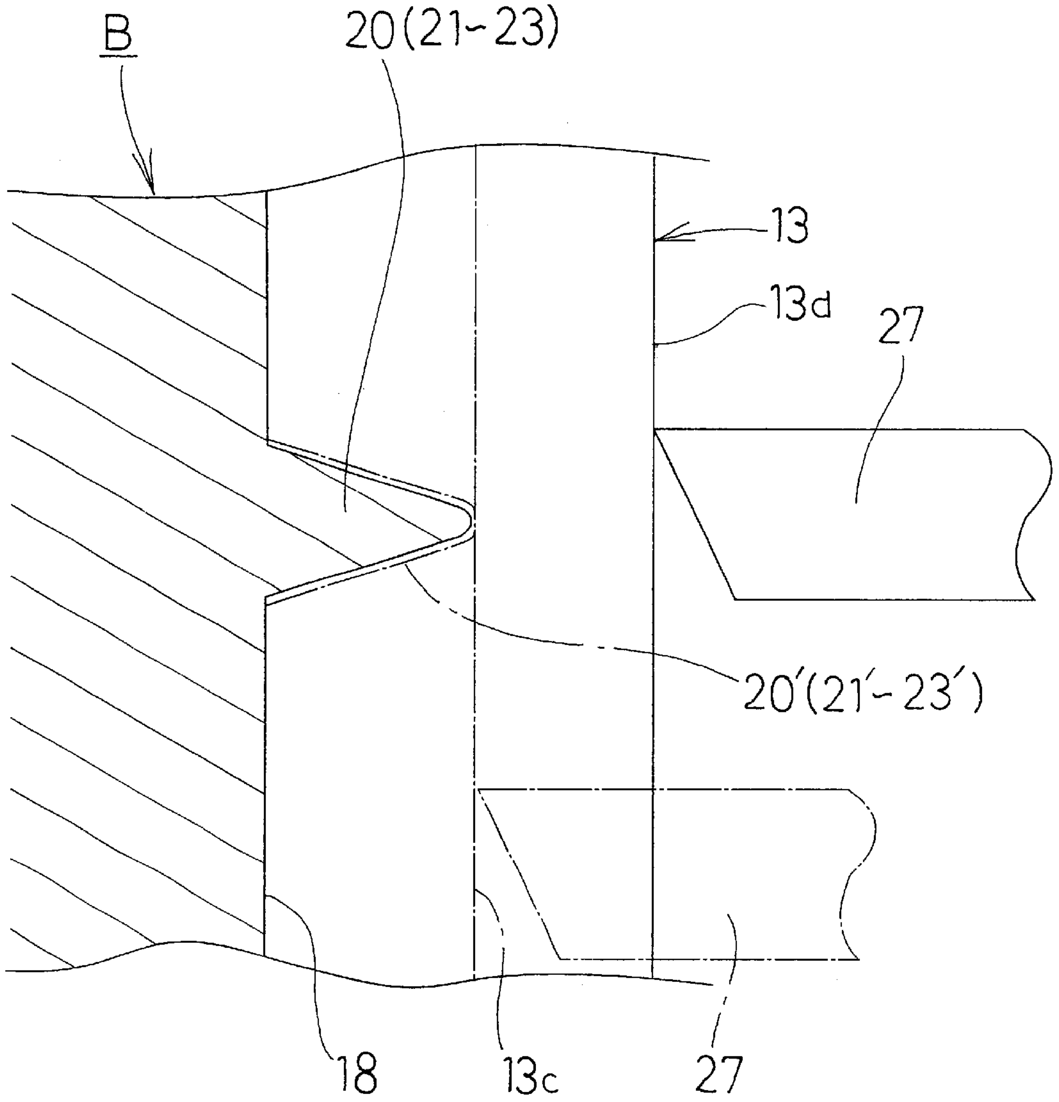
FIG. 8 is an enlarged illustration of an encircled portion I of FIG. 6.
Figure 9:
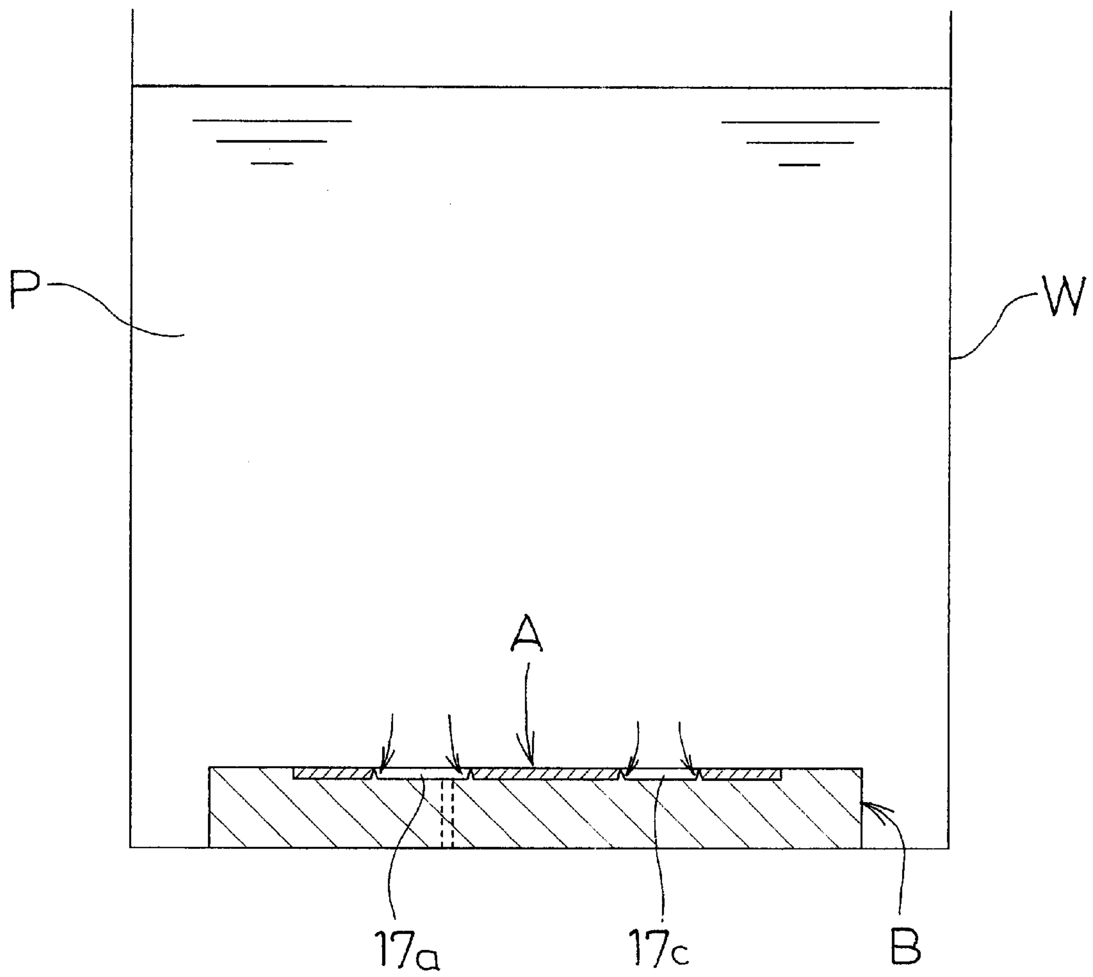
FIG. 9 is a front elevation showing a condition where the thin plate support for chucking in a condition, on which a thin plate is secured by bonding, is dipped within a releasing agent vessel.

As shown in FIGS. 6 to 8, the window opening defining grooves 20' to 23' are formed in a depth to reach a machining completion surface 13*c* when machining of the foreign coin 13 is performed up to a desired plate thickness.

Next, to the receptacle cavity 18 or one side surface of the foreign coin 13 carrying the three-dimensional pattern 14, or both, an instant adhesive is applied.

Then, the foreign coin 13 is set within the receptacle cavity 18 with inserting the positioning pin 25 into the positioning hole 24 in the thin plate support 25 for positioning the coin with respect to the support.

In general, since the three-dimensional pattern in the three-dimensional pattern portion is quite fine, it is quite difficult to accurately mate the three-dimensional pattern portion 14 of the coin to the engaging portion 19 of the thin plate support B. However, by inserting the positioning pin 25 of the foreign coin 13 into the positioning hole 24 of the thin plate support B, the coin may be accurately mate the three-dimensional pattern portion 14 with the engaging portion 19 in a short period.

Accordingly, the positioning pin 25 of the foreign coin 13 is inserted into the positioning hole 24 of the thin plate support B. Then, the foreign coin 13 is received within the receptacle cavity 18 with exactly mating the three-dimensional pattern portion 14 with the engaging portion 19. At this position, the ridges 20 to 23 enter into the window opening defining grooves 20' to 23'.

On the other hand, the foreign coin 13 is firmly fixed in the receptacle cavity 18 as bonded by the instant adhesive so that dislocation of the coin will never be caused during machining. As a result, the coin may be machines up to smaller thickness.

As shown in FIG. 6, the thin plate support B is chucked by a chuck 26 of the machine tool, such as lathe turning machine or the like, to be driven to rotate. While the thin plate support B is rotated carrying the foreign coin 13, the coin 13 is machined by a machining tool 27 from the other side surface 13*d* of the circular main plate 13*a* to the machining completion surface 13*c* to obtain the plate of the predetermined thickness, e.g. 0.4 mm.

As machined to the matching completion surface 13*c,* the window opening defining grooves 20' to 23' appear in the machining completion surface 13*c* to produce a thin plate A defining window openings 17*a,* 17*b,* 17*c* and 17*d* in regions surrounded by the annular portion 15, the central portion 14*c* and the connecting pieces 16*a,* 16*b,* 16*c* and 16*d,* matching with contours in the annular portion 15, the central portion 14*c* and the connecting pieces 16*a,* 16*b,* 16*c* and 16*d.*

After completion of machining, the thin plate support firmly bonded the thin plate A is then dipped in a vessel W filled with a releasing agent P, such as aceton, degloss or the like.

By this, the releasing agent P may penetrate between the thin plate A and the receptacle cavity 18 through the window openings 17*a,* 17*b,* 17*c* and 17*d* of the thin plate A to release the thin plate A from the receptacle cavity 18 of the thin plate support B. Thus, the thin plate A can be released from the receptacle cavity 18 without exerting external force and without causing deformation of the thin plate A.

Figure 10:
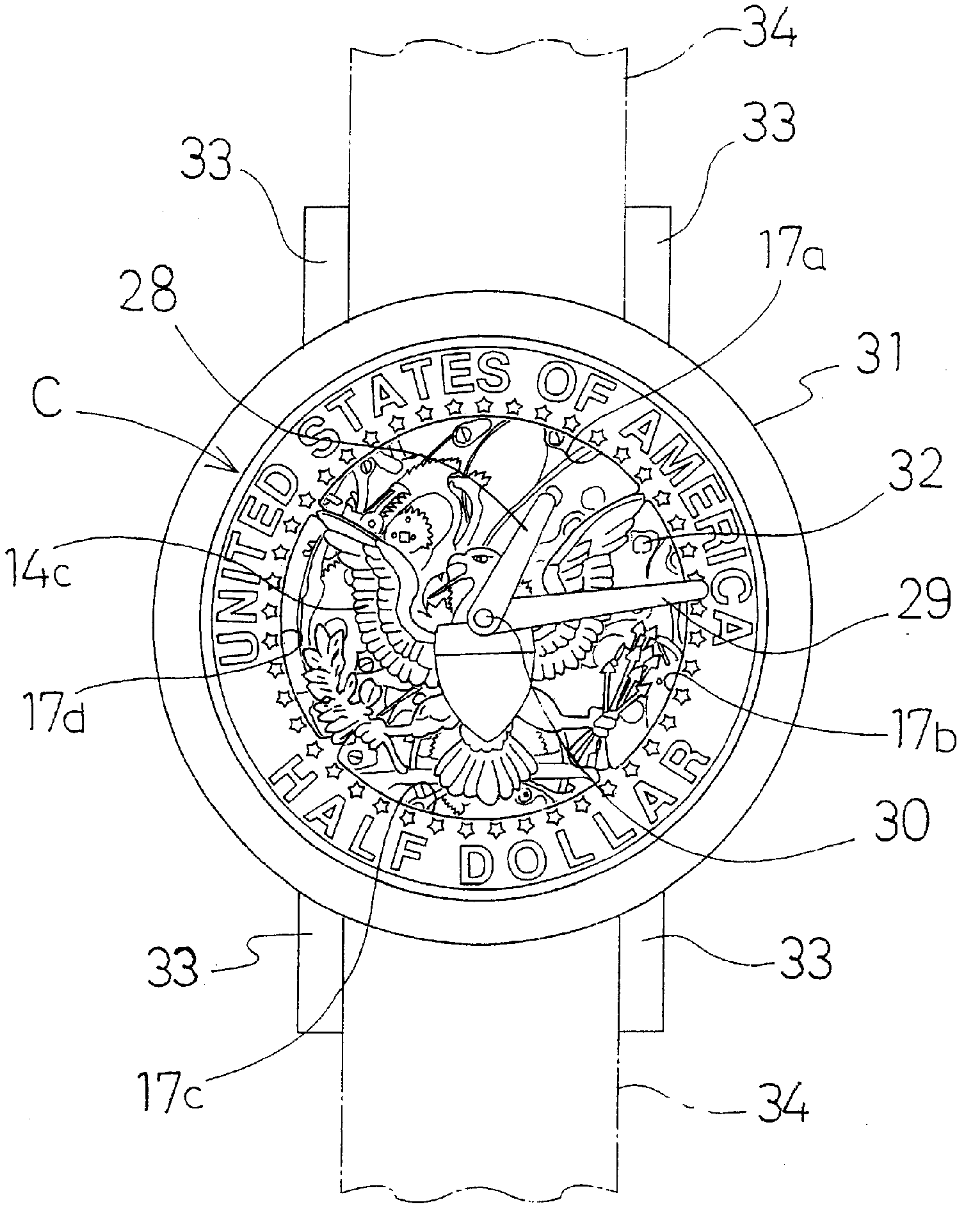
FIG. 10 is a front elevation of a watch, in which the thin plate is used as hour plate.

As shown in FIG. 10, the thin plate A thus produced is formed with a shaft hole (not shown) for inserting a mounting shaft 30 for an hour hand 28, a minutes hand 29 and so forth in the central portion 14*c*. Thus, the thin plate A can be used as hour plate C of the watch, for example.

The reference numeral 31 denotes a casing of wrist watch using the thin plate A as the hour plate C. Through the window openings 17*a,* 17*b,* 17*c* and 17*d* of the hour plate C, a part of the movement of the watch can be seen. It should be noted that the reference numeral 33 denotes lugs for connecting a belt 34 with the casing 31.

Next, the second embodiment of the thin plate support for chucking according to the present invention will be discussed.

Figure 11:
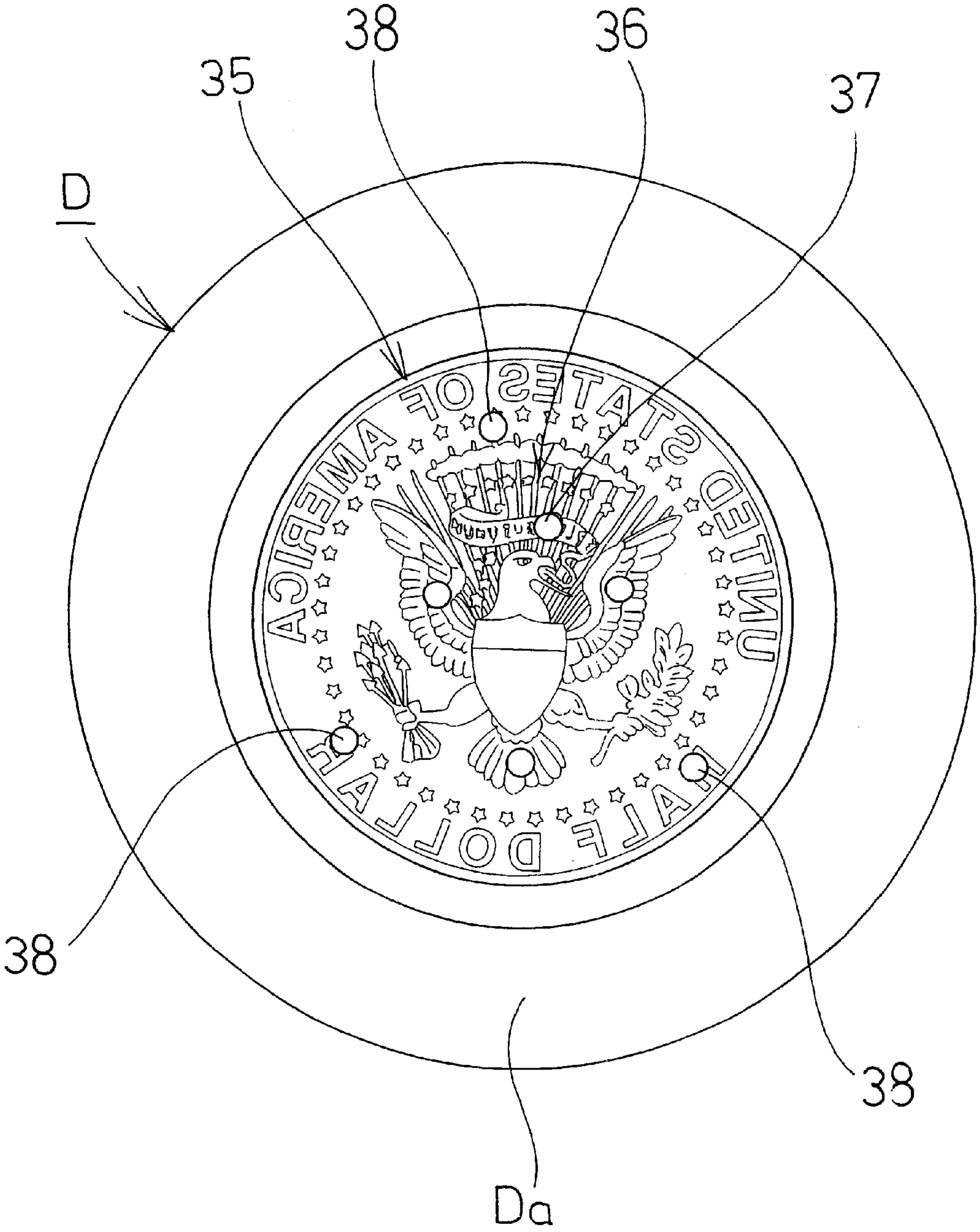
FIG. 11 is one side elevation of the second embodiment of the thin plate support for chucking according to the present invention.
Figure 12:
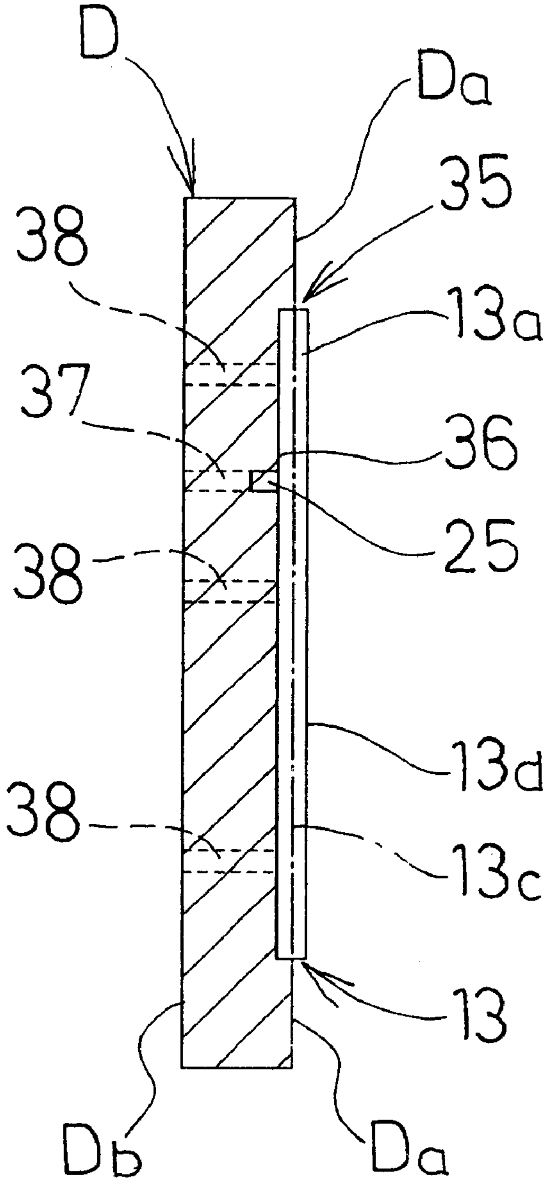
FIG. 12 is a section of the second embodiment of the thin plate support for chucking according to the present invention.
Figure 13:
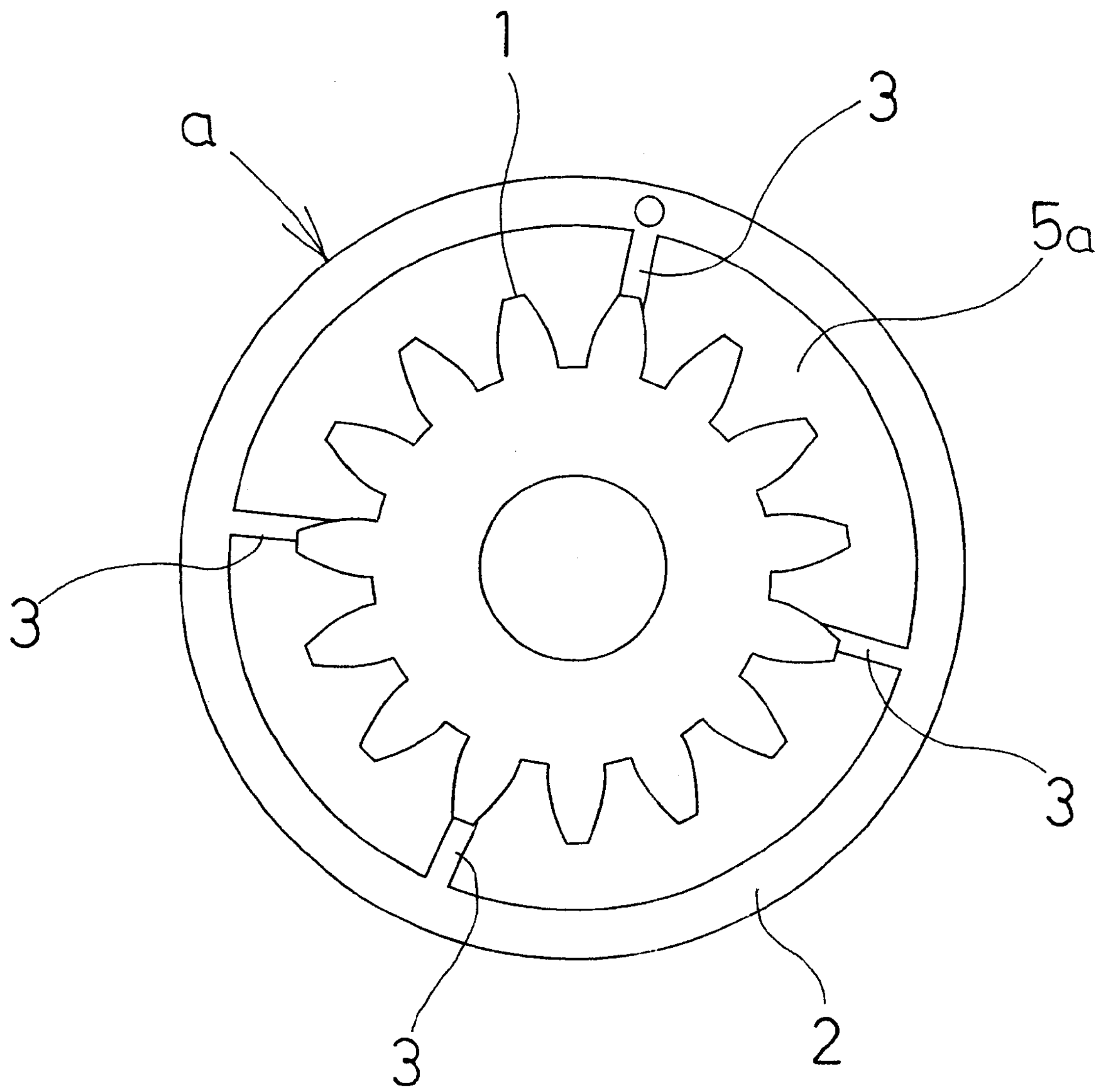
FIG. 13 is one side elevation of the conventional processing object.
Figure 14:
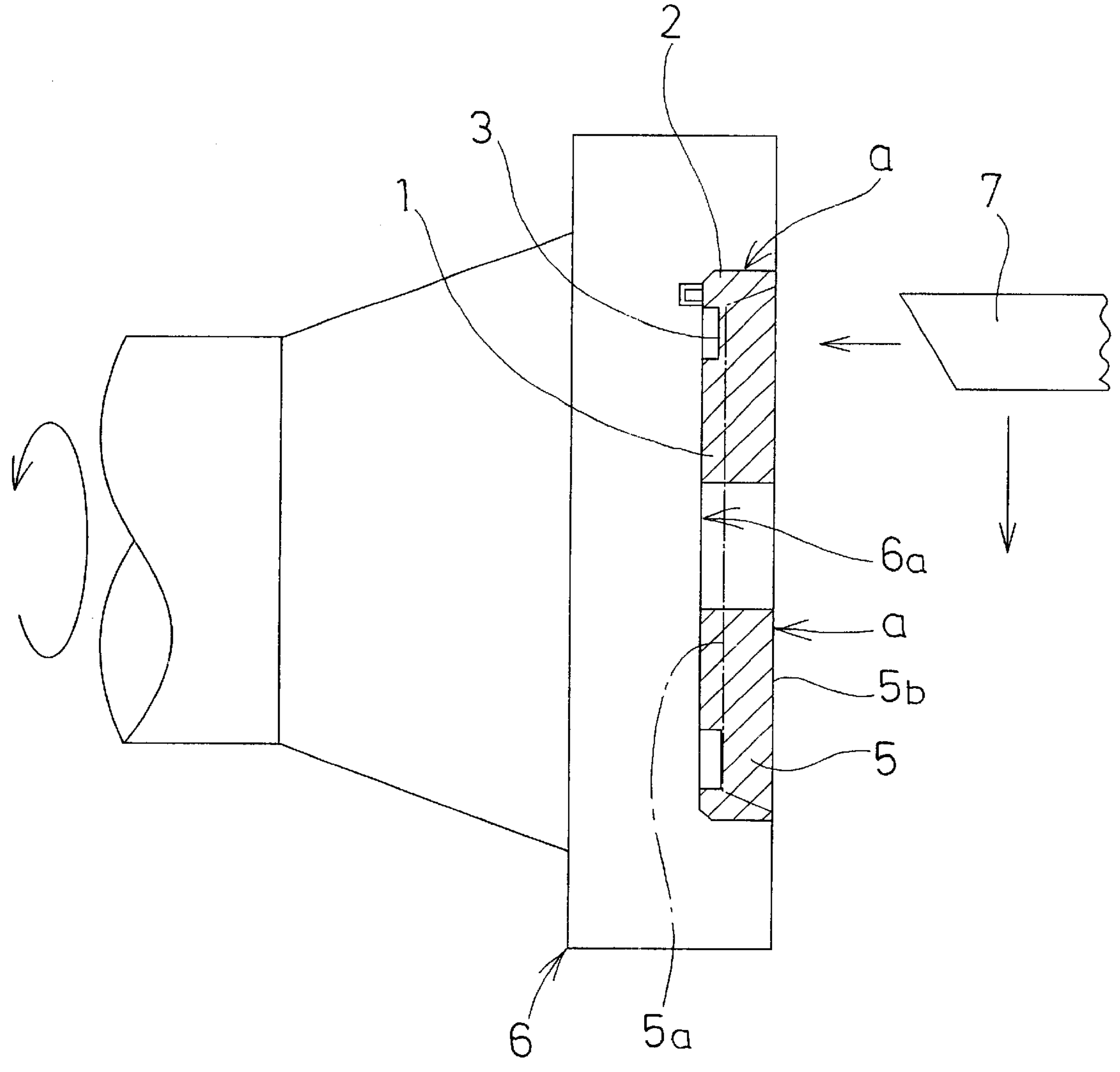
FIG. 14 is a side elevation in a condition where the processing object is received in a receptacle cavity portion formed in the chuck of a machine tool, showing a condition before machining of the processing object.
Figure 15:
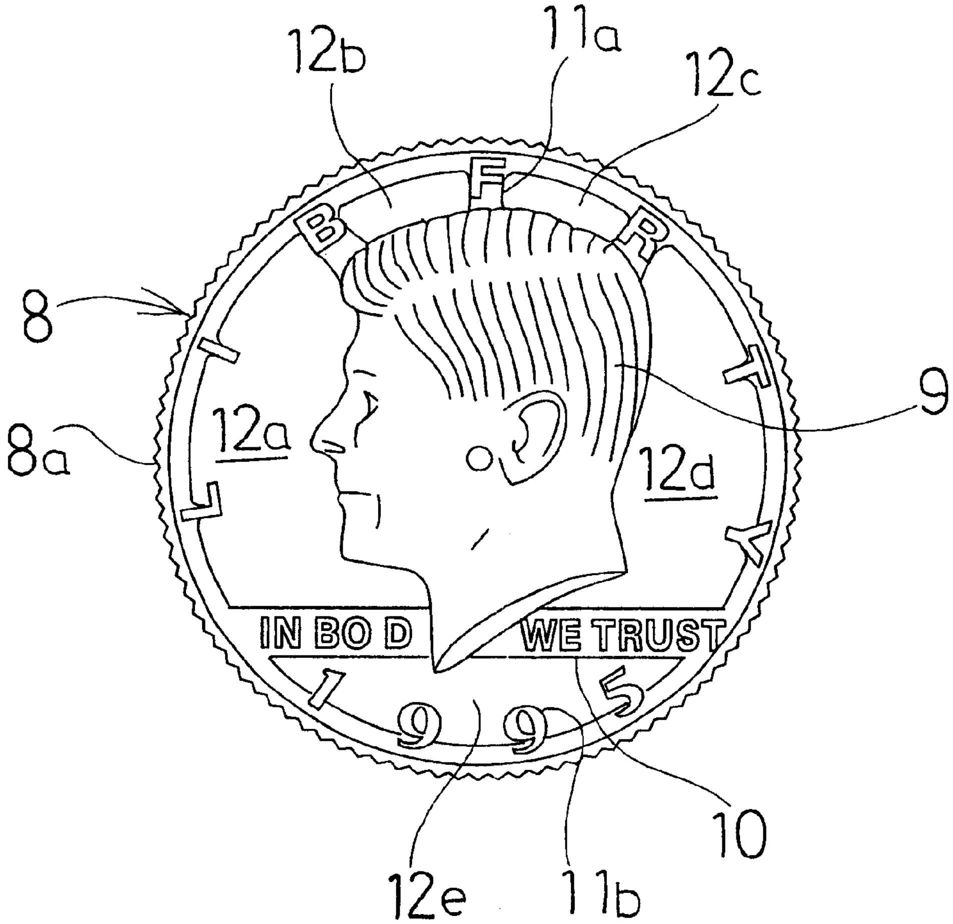
FIG. 15 is one side elevation of the hour plate of the watch, in which window opening is formed in the coin.

As shown in FIGS. 11 and 12, a thin plate support D for chucking is formed disc shaped configuration formed with a receptacle cavity 35 for receiving therein one of the foreign coin 13 at the center on one side surface Da in coaxial fashion.

The receptacle cavity 35 is shallower than the circular main plate 13*a* of the foreign coin 13. Particularly, the receptacle cavity 35 is formed in a depth of about 0.4 mm, for example. Also, an engaging portion 36 is curved by electric discharge machining, for example.

The engaging portion 36 is formed with a three-dimensional pattern complementary with the three-dimensional pattern portion 14 on one side surface of the foreign coin 13. However, different from the first embodiment, the ridges 20 to 23 are not formed.

The reference numeral 37 denotes a positioning hole for positioning the foreign coin 13 received within the receptacle cavity 35. The positioning hole 37 is located at a position where the window opening 17*a* is formed in the later process step.

The reference numeral 38 denotes a releasing agent penetration aperture opening both ends on the other side surface Db of the thin plate support D for chucking. Number, internal diameter, positions of the releasing agent penetration apertures are appropriately set in view of viscosity of the releasing agent, diameter of the foreign coin and so forth.

Discussion will be given for the second embodiment of the production method of the thin plate according to the present invention with employing the thin plate support D.

Similarly to the first embodiment, with the circular main plate 13*a* of the foreign coin 13, at the position corresponding to the positioning hole 37 of the thin plate support D, the positioning pin 25 is projected as shown in FIG. 12. In the shown embodiment, the window opening defining groove matching with the contour of the window openings 17*a,* 17*b,* 17*c* and 17*d* are not formed.

Next, within the receptacle cavity 35 and on one side surface of the foreign coin 13 formed with the three-dimensional pattern 14, or both, an adhesive, such as instant adhesion type adhesive, is applied.

Then, the foreign coin 13 is set in the receptacle cavity 25 with positioning with respect to the receptacle cavity by inserting the positioning pin 25 into the positioning hole 37 of the receptacle cavity 35 of the thin plate support D.

By this, the three-dimensional pattern portion 14 of the foreign coin 13 is accurately mated with the engaging portion 36. Then, the foreign coin 13 is firmly secured in the receptacle cavity 35 by adhesive.

The thin plate support D is chucked on the machine tool, such as the lathe turning machine or the like by the chuck 26 to be driven to rotate. While the thin plate support D carrying with the foreign coin 13 is driven to rotate, matching is performed from the other side surface Db of the circular main plate 13*a* up to the machining completion surface 13*c,* at which the plate thickness becomes the predetermined thickness, e.g. about 0.4 mm. Different from the first embodiment, at this step, the window openings are not formed.

After machining, the foreign coin 13 which is not formed with the window openings bonded on the thin plate support D is dipped into the releasing agent P which is similar to the above. The releasing agent P penetrates between the bottom surface of the receptacle cavity 35 and one side surface of the foreign coin 13 via releasing agent penetration apertures 38 formed in the thin plate support D.

By this, the foreign coin 13 can be released from the receptacle cavity 35 without exerting external force and thus without causing deformation.

For the foreign coin 13 released from the thin plate support D, a laser machining, a wire cut electric spark machining and a press working is performed for forming the window openings 17*a,* 17*b,* 17*c* and 17*d* of the same shape as those formed in the former embodiment.

By this, as shown in FIG. 2, the thin plate A having the annular portion 15 extending along the external peripheral edge 13*b,* a central portion 14*c* where designed American eagle is relieved, and connecting pieces 16*a,* 16*b,* 16*c* and 16*d* connecting the central portion 14*c* with the annular portion 15, can be produced.

Without forming the window openings in the condition rigidly secure the foreign coin 13 on the thin plate support D, the window openings are formed by post process. Therefore, even for the soft metallic machining object, such as gold coin, silver coin and so forth having relatively low hardness, thin plate can be formed with the window opening without causing bowing or kink.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

In the foregoing embodiment, the second embodiment of the thin plate support is discussed to have the releasing agent penetration apertures, it is equally possible to have a construction, in which the releasing agent penetration apertures are formed in the first embodiment of the thin plate support.

On the other hand, in the first embodiment, the window openings are formed in the condition where the foreign coin is received with in the receptacle cavity of the thin plate support. For this purpose, the window opening defining grooves are formed in the matching object. However, it is not always required to form the window opening defining groove in the machining object. In this case, the three-dimensional pattern can be left by machining the foreign coin into the thickness leaving the three-dimensional pattern portion.

On the other hand, in respective of shown embodiments, discussion has been given in terms of formation of the thin plate from the foreign coin, the same production method may be applicable for those formed imitating the gold coin, the silver coin or the like or imitated coin to be used for coin machine in amusement arcade or the like.

In the present invention, since the thin plate support is chucked on the chuck of the machine tool, such as lathe turning machine with carrying the coin, medal or the like, no chucking force will be directly applied to the thin plate. Therefore, bowing or other deformation will never be caused.

Among both side surfaces of the coin, the engaging portion complementary with the three-dimensional pattern on one side surface is formed in the receptacle cavity of the thin plate support instead of the bottom surface of the receptacle cavity provided in the chuck. Therefore, it is unnecessary to replace the chuck per se even when the processing object having different three-dimensional pattern or different size is machined.

In the foregoing first embodiment, since the machining is performed with leaving the three-dimensional pattern portion but the window openings being formed, machining of the machining object and formation of the window opening can be performed simultaneously.

The window defining grooves matching with the contour of the window openings are formed in the machining object, and machining is performed until the window opening defining grooves appear, the window openings can be formed easily even when the height difference between the portion where the window openings are formed and the three-dimensional pattern portion is insufficient.

On the other hand, by adjusting the depth of the window opening defining grooves, the desired shapes of window openings can be formed irrespective of thickness of the thin plate. It is also possible to leave the portions which are to be machined out to form the window openings, together with the three-dimensional pattern portion.

Also, by terminating machining before opening the window holes in the machining object, and releasing the machined thin plate from the receptacle cavity of the thin plate support, laser machining or the like is performed for forming the window openings with maintaining the three-dimensional pattern portion. This process is particularly effective when the coin or medal formed of the material having relatively low hardness is processed as the cutting edge can be neat.

Among the positioning means to be a pair for mutually matching the three-dimensional pattern portion of the machining object and the engaging portion of the thin plate support, one is provided on the machining object and the other is provided in the receptacle cavity to set the machining object in the receptacle cavity with positioning by means of the positioning means. Since the machining object is received within the receptacle cavity, positioning of the machining object can be done easily and in short period.

Since machining is performed in the condition where the machining object is rigidly secured in the receptacle cavity of the thin plate support. The machining object can be machined in a thickness about 0.4 mm.

Since the thin plate support carrying the machining object rigidly secured by bonding is dipped into the releasing agent to release the thin plate or the machining object from the receptacle cavity. When the thin plate or the machining object as half processed is released, no mechanical external force is applied to cause deformation in releasing from the machining object.

Since the engaging portion is formed in complementary shape with the three-dimensional pattern portion and ridges with a predetermined height are formed matching with the contour of the window openings. Thus, the window opening can be formed easily.

Since the releasing agent penetration apertures are formed in the bottom of the receptacle cavity for introducing the releasing agent between the machining object and the receptacle cavity for permitting releasing of the machining object as the thin plate or half processed machining object, without exerting external force. Accordingly, deformation, such as bowing or the like which can be otherwise caused upon releasing the thin plate or half processed object.

What is claimed is:

1. A production method of a thin plate comprising:

preparing thin plate support with a receptacle cavity having a bottom surface formed with a complementary three-dimensional pattern with a three-dimensional pattern on one side surface of a machining object;

setting said machining object within said receptacle cavity with mating said complementary three-dimensional pattern with said three-dimensional pattern on said one surface of said machining object;

chucking said thin plate support carrying said machining object set in said receptacle cavity on a machine tool;

driving said thin plate support together with said machining object to rotate;

machining said machining object as being driven to rotate on said machine tool from the other side of said machining object by means of a cutting tool;

and said machining object is machined until said three-dimensional pattern remains on said one side surface and window openings are formed around said three-dimensional pattern.

2. A production method of a thin plate as set forth in claim 1, wherein said cutting tool machines said machining object to create window opening defining grooves extending along the contour of said window openings.

3. A production method of a thin plate as set forth in claim 1, wherein said machining process is terminated before window openings are formed and said machining object is released from said thin plate support, and subsequently subject to cutting process for forming the thin plate maintaining said three-dimensional pattern and defining said window openings.

4. A production method of a thin plate as set forth in claim 1, which further comprises positioning means consisted of a pair of members, for mating and engaging a three-dimensional pattern portion of said machining object and said thin plate support for chucking, one of said members of said positioning means being provided on said machining object and the other of said members being provided in a receptacle cavity, said machining object being received within said receptacle cavity with positioning by said positioning means for making said pair of members.

5. A production method of a thin plate as set forth in claim 1, wherein said machining object is bonded and fixed within said receptacle cavity of said thin plate support for chucking by an adhesive for performing machining of said machining object.

6. A production method of a thin plate as set forth in claim 5, wherein said thin plate support bonded a thin plate or said machining object on machining within said receptacle cavity, is dipped in a releasing agent for releasing said thin plate or said machining object on machining object from said receptacle cavity.

7. A thin plate support for chucking provided with a receptacle cavity having a bottom surface formed with a mating portion mating with one side of a machining object, wherein said mating portion is formed with a three-dimensional pattern complementary with a three-dimensional pattern of said machining object, said mating portion also has a ridge matching with a contour of a window opening to be formed and with a predetermined height.

8. A thin plate support for chucking as set forth in claim 7, wherein said receptacle cavity and said machining object are bonded by an adhesive while machined and said thin plate support is released said matching object by releasing agent penetrating therebetween.

* * * * *